United States Patent [19]
Sheaffer

[11] Patent Number: 6,136,185
[45] Date of Patent: Oct. 24, 2000

[54] AEROBIC BIODEGRADABLE WASTE TREATMENT SYSTEM FOR LARGE SCALE ANIMAL HUSBANDRY OPERATIONS

[75] Inventor: John R. Sheaffer, Wheaton, Ill.

[73] Assignee: Sheaffer International Ltd., Naperville, Ill.

[21] Appl. No.: 09/100,379

[22] Filed: Jun. 19, 1998

[51] Int. Cl.[7] ........................................................ C02F 3/30
[52] U.S. Cl. .................... 210/153; 210/195.1; 210/202; 210/220; 210/605; 210/903; 119/450
[58] Field of Search ................................ 210/194, 195.1, 210/196, 202, 220, 221.2, 257.1, 258, 605, 622, 903, 153; 119/450

[56] References Cited

U.S. PATENT DOCUMENTS

| | | | |
|---|---|---|---|
| 3,429,806 | 2/1969 | Carter et al. ........................ | 210/195.1 |
| 3,897,334 | 7/1975 | Murphy ................................ | 210/15 |
| 4,255,266 | 3/1981 | Moreaud et al. .................... | 210/614 |
| 4,338,337 | 7/1982 | Frankl ................................. | 210/622 |
| 4,797,212 | 1/1989 | von Nordenskjöld ............... | 210/614 |
| 4,800,021 | 1/1989 | Desbus ................................ | 210/605 |
| 4,818,408 | 4/1989 | Hamamoto .......................... | 210/614 |
| 4,824,563 | 4/1989 | Iwahori et al. ..................... | 210/195.1 |
| 4,895,645 | 1/1990 | Zorich, Jr. ........................... | 210/195.1 |
| 5,192,442 | 3/1993 | Piccirillo et al. .................... | 210/605 |
| 5,234,595 | 8/1993 | DeGregorio et al. ............... | 210/605 |
| 5,529,693 | 6/1996 | Yano et al. ......................... | 210/614 |
| 5,545,325 | 8/1996 | Hsu et al. ............................ | 210/202 |
| 5,972,219 | 10/1999 | Habets et al. ....................... | 210/605 |

FOREIGN PATENT DOCUMENTS 889631  12/1981  U.S.S.R. .

OTHER PUBLICATIONS

Lay, Chuck A Lawsuit Over Hog Odor Forced MFA to Build an Aerobic Lagoon at Its Research Farm in Saline County. The Cooperative Ultimately Prevailed and Kept the Facility Open. But the Implications are Ominous for Pork Producers. Todays Farmer pp. 5–9, Jun./Jul. 1996.

Gasana, M.D., Ph.D., Janvier Study of the Concentrations of Fecal Coliforms in the Two Aerated Treatment Cells at the Chancellory's (Itasca, IL) Wastewater Reclamation and Reuse System, prepared for New Water Foundation, pp. 1–, Jul. 11, 1995.

Manure and Wastewater Management 8, pp. 69–91.

Eckenfelder, Wesley; "Principles of Water Quality Management" p. 223, 1980.

McGhee & Steel, "Water Supply & Sewerage" pp. 494–500.

Primary Examiner—Christopher Upton
Attorney, Agent, or Firm—Piper Marbury Rudnick & Wolfe; Jefferson Perkins, Esq.

[57] ABSTRACT

An animal waste treatment system, particularly adapted to process the waste from a large-scale confined animal facility, has two treatment cells and a holding reservoir. Each of the treatment cells has an anaerobic zone which is two to five feet deep and an aerobic zone on top of the anaerobic zone which is at least twelve feet deep. Effluent from the facility is introduced into the anaerobic zone of the first cell; the aerobic zone of the first cell has a fluid connection to the anaerobic zone of the second cell. Residence times are preferably twenty-one days per cell. The aerobic zone is created by the injection of air with a coarse aerator. Oxygen introduced by the aeration oxidizes reduced nitrogen compounds and other volatiles; much of the nitrogen escapes as N2 to the atmosphere. A portion of the cleaned water is returned to the facility for dilution and flushing purposes. The rest of the cleaned water is used to irrigate crops. The present invention also has application to nonagricultural uses, such as to subdivisions which are unable to obtain connections to city sewer systems.

15 Claims, 2 Drawing Sheets

FORMULA $t = \dfrac{E}{2.3 \, K_1 \times (100-E)}$

AEROBIC BIODEGRADABLE WASTE TREATMENT SYSTEM FOR LARGE SCALE ANIMAL HUSBANDRY OPERATIONS

CROSS REFERENCE TO RELATED APPLICATIONS

This application is related to application Ser. No. 09/071,455, filed May 1, 1998. The disclosure of that application is fully incorporated by reference herein.

TECHNICAL FIELD OF THE INVENTION

The present invention relates in general to biodegradable waste treatment systems, and more particularly to aerobic biodegradable waste treatment systems suitable for use with large-scale livestock operations.

BACKGROUND OF THE INVENTION

Commercial livestock raising operations continue to pursue ways in which output may be increased and costs per raised animal reduced. Recently, confined animal feeding operations (CAFOs) or "factory farms" have become widespread. These bear little resemblance to the animal husbandry operations of a century ago. In a confined animal facility, a single building houses thousands of animals, which may be cattle, pigs or poultry. In one commercial installation, about 38,000 animals are present in the facility at the same time.

The public has begun to object to these large-scale corporate farms as bad neighbors and water polluters. The keeping of thousands of animals means disposing of thousands of pounds of their bodily wastes, known as biodegradable mass or BOD (an acronym referring to the biological oxygen demand of the waste). There are two waste disposal methods which are presently employed in these operations.

The first is the spreading of untreated manure onto surrounding agricultural fields. While this fertilizes the field on which it is spread, this method produces quite objectionable odors during the spreading and creates water pollution from field runoff.

The second is the essentially anaerobic sewage treatment of the manure in large lagoons. This creates sludge disposal problems. The water used in treating the manure in this manner is released into the environment, but the water has large concentrations of ammonia and other nutrients which limit how often the wastewater can be applied to surrounding agricultural fields; only so much of the nutrients can be irrigated onto fields without exceeding the capacity of the plants therein to metabolize them. The loading of fields by wastewater streams typically is regulated by state environmental statutes. To the extent that these nutrients cannot be absorbed by the plants of the field on which they are put, the nutrients find their way into streams and rivers, creating environmental problems such as algal blooms and fish kills. There is also concern that these nutrients will begin to contaminate drinking water. Anaerobic lagoons also are remarkable for their odiferous emissions.

A combination aerobic and anaerobic lagoon has been developed by MFA Incorporated of Columbia, Mo. In this system, air is injected into the top six feet of the lagoon by diffusers which are suspended from the surface. Irrigation water and recycled water for the hog buildings to which this lagoon are connected are drawn out of the top eighteen inches of the lagoon. The MFA system is designed to control lagoon odor caused by $H_2S$. It still does not meet the need of reducing combined nitrogen nutrients in the treated lagoon water, will still result in the production of large quantities of sludge and, as such, points out the need for further improvements.

SUMMARY OF THE INVENTION

According to one aspect of the invention, a biodegradable mass treatment system has first and second treatment cells. A conduit connects the biodegradable mass source, such as a confined animal facility, with the bottom of the first cell. A first aerator means, preferably a plurality of static tube aerators, is disposed in the first cell for introducing compressed air. The first aerator means is spaced off of the bottom of the cell by at least two feet. A first anaerobic zone extends between the bottom of the cell and this aerator elevation. A first aerobic zone of the first cell extends from the aerator means elevation to the water surface. This first aerobic zone should be at least twelve feet in extent.

A transfer conduit has a first end location near the surface of the water of the first aerobic zone and a second and disposed near the bottom of a second anaerobic zone located in a second treatment cell. A second aerator means, such as a second plurality of static tube aerators, is disposed in the second cell at a predetermined distance, which should be at least two feet, from the bottom of the second cell. A second anaerobic zone extends from the second aerator means downward to the bottom of the second cell, and a second aerobic zone extends upward to the water surface of the second cell. The difference between the second aerator elevation and the water surface of the second cell is at least twelve feet.

A further conduit removes treated wastewater from the second cell for use in agricultural purposes and for use as a recycling water source. In a preferred embodiment, treated water in the aerobic zone of the second cell is fed to a water reservoir. Optionally, the third reservoir also has aeration equipment. Preferably, a portion of the water from the reservoir is recycled back to the confined animal facility for use in dilution flushing, and the remainder is sent to irrigate surrounding fields.

In another aspect of the invention, the flow rates and sizes are selected such that the system may use interruptible power, which is considerably less expensive than twenty-four hour demand power. By using power which is interrupted on a schedule (one schedule is to interrupt power for four hours every weekday afternoon), the electrical costs incurred in operating the system can be significantly reduced. One or more blowers are sized to send air to the aerations in the first and second treatment cells, such that the amount of oxygen going into solution in the aerobic zones over the residence time of forty two days is at least 2 lbs. and as much as 4.5 lbs. per pound of BOD5 introduced into the treatment system. The volumes of the first and second cells should be large enough to contain this amount of oxygen. The blowers are so sized that the oxygen level in the aerobic zones of the treatment cells approaches a saturation level, which is about 9 mg/l (temperature 68° F. at sea level). Having this amount of oxygen available creates an "oxygen battery" which can be used to react with organic nitrogen, $NH_3$, $H_2S$ and other objectionable contents even when power to the blowers is interrupted. Without fresh input of more air, and therefore more oxygen, into the cells, the oxygen concentrations in the cells will decline by known rates. If the cells are large enough, however, the oxygen content will never fall below 2 milligrams per liter during the power interruption period, obviating any odor problem.

The present invention has several technical advantages over other solutions to the factory farm waste problem. One of the advantages is that the present invention obviates any odor emanating from the lagoons or the treatment reservoir, and further gets rid of objectionable odors that otherwise might be associated with irrigating the crop land using treated water from the confined animal facility. Another advantage is the enhanced cleanliness of the confined animals, since in a preferred embodiment the confined animal facility is flushed at a rate of four to twelve times that of conventional practice. This prevents ammonia build up within the facility and reduces respiratory illnesses due to high humidity.

A third technical advantage is the significant reduction in the amount of combined nitrogen which is left in the treated water. The present invention, through the long residence times of the wastewater in the cells and the reservoir, allows about 68 percent of the combined nitrogen to be converted into elemental nitrogen, which is stripped off into the atmosphere. The amount of land which must be irrigated by the treated wastewater is therefore reduced to approximately one third of previous requirements, as the amount of combined nitrogen loading on the agricultural plants is reduced by this amount.

According to yet another aspect of the invention, two cells are used instead of a combined cell in order to take advantage of higher conversion rates. It is known that, in a particular cell, the amount of conversion of $BOD_5$ starts leveling off after an initial sharp rise over time. The shoulder of a graph of convention rate "efficiency" over time occurs at about twenty to twenty four days. The present invention has cell volumes and treatment flows so designed that the fluid resides no less than twenty-one days in the first treatment cell and no less than another twenty-one days in the second treatment cell. When the partially treated wastewater enters the second cell, the conversion rate once again rises sharply over the first few days until it too begins to level off. The amount of combined nitrogen conversion that one is able to obtain in two cells is significantly greater than the amount of conversion of a single cell having a double volume. Two cells also provide process stability and an enhancement of the ability to take uneven flows.

BRIEF DESCRIPTION OF THE DRAWINGS

Further aspects of the invention and their advantages will be discerned in the following detailed description, in which like characters identify like parts and in which.

DETAILED DESCRIPTION OF ILLUSTRATED EMBODIMENT

Figure 1:
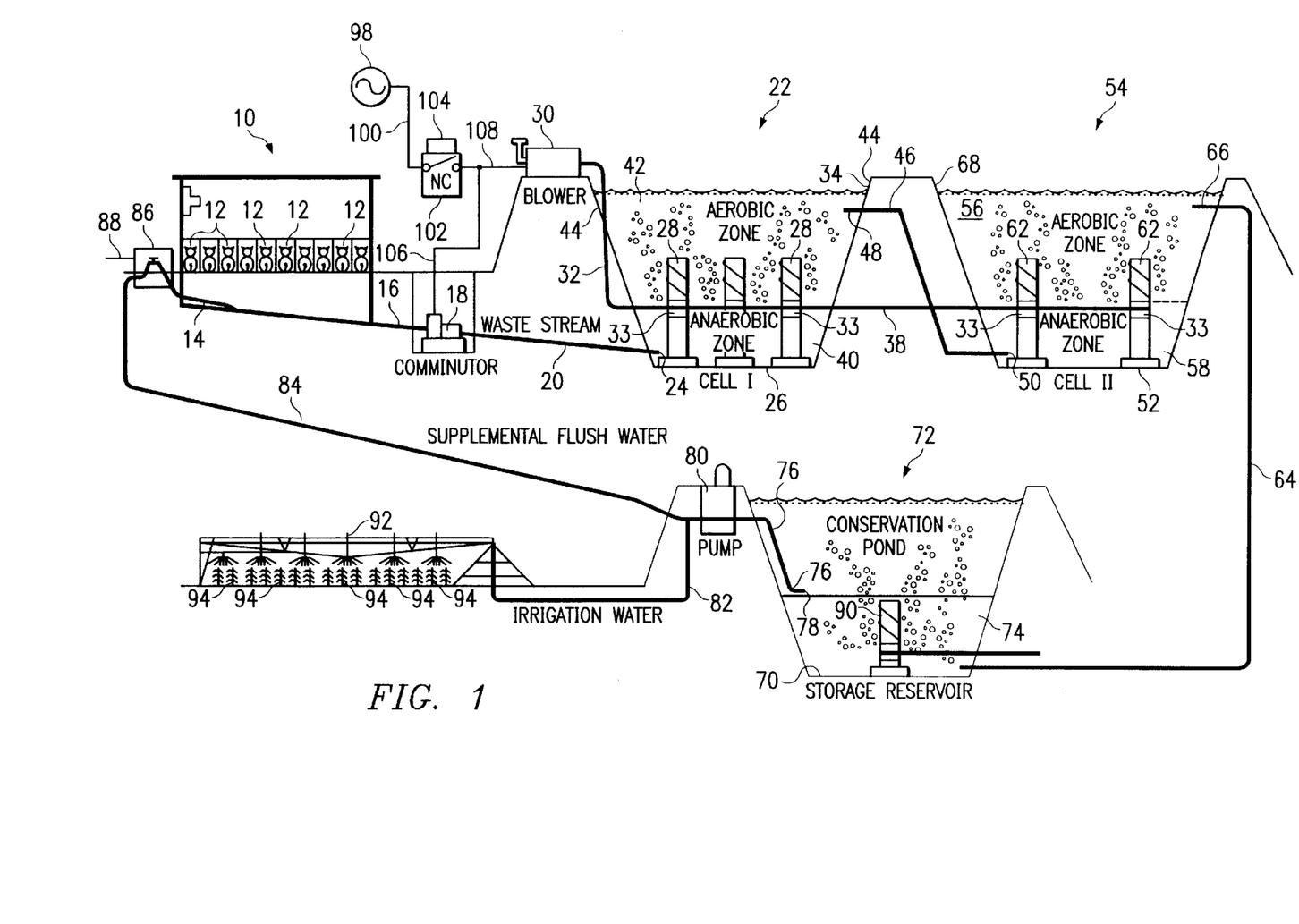
FIG. 1 is a schematic diagram illustrating the different components of the biodegradable waste treatment system according to the invention.
Figure 2:
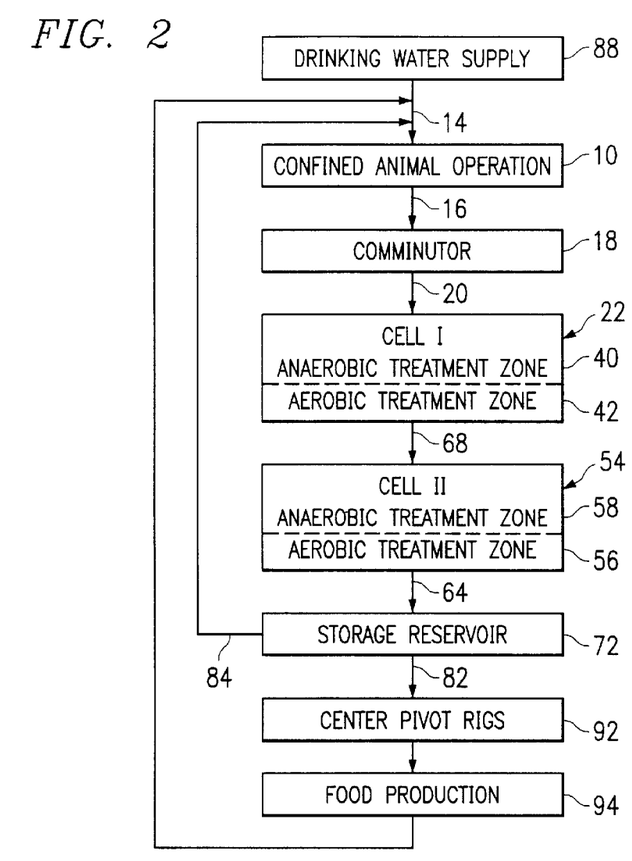
FIG. 2 is a process flow diagram illustrating the biodegradable waste treatment process according to the invention.

FIG. 1 illustrates the basic components of the biodegradable wastewater treatment system according to the invention and FIG. 2 shows a corresponding process flow-diagram. A confined animal facility, containing a number of confined animals, is indicated at 10. These animals 12, which can be hogs, beef or dairy cattle, chickens or other poultry, exist in very large numbers, with herds above one thousand animals being common. The single building illustrated is schematic, as there may be two, three or more such buildings in the confined animal facility 10.

The confined animals 12 produce urine and fecal matter which, in a preferred embodiment, fall through slots in a raised floor. The animal waste matter ("$BOD_5$"), as combined with wash water, is in turn combined with a slurry stream 14 to be flushed into a conduit 16 (once again, one is shown, although several may be provided). The conduit 16 leads to a comminutor 18 in which any solid portions of the waste in pipe 16 are macerated. A conduit segment 20 connects the output of comminutor 18 to a first treatment cell indicated generally at 22. An end 24 of the conduit 20 is located at or near the bottom 26 of the first cell 22.

The cell 22 has installed therein a plurality of static tube aerators 28. While three such aerators 28 appear in the schematic illustration of FIG. 1, an actual large-scale operation may have hundreds of such aerators in cell 22, which are horizontally spaced apart from each other. A source of compressed air, indicated schematically by the blower 30, provides compressed air in a conduit 32 to each of the aerators 28. The conduit 32 should be built of a material which can withstand relatively high air temperatures caused by compression of the air; steel and ductile iron are possibilities. The conduit 32 has openings 33 beneath the aerators 28, such that air is emitted into the first cell at an elevation above the floor 26 but substantially below a third elevation 34. The difference between the bottom 26 and the pipe elevation 38 should be at least two, and is preferably at least five, feet. The anaerobic zone 40 can be made deeper to accommodate the storage of nonvolatile, largely inorganic and inert solids, which will need to be removed after a number of decades. The distance between the pipe elevation 38 and the planned liquid surface elevation 34 should be at least twelve feet, and more preferably is twenty feet.

The depth of the air pipe 32 has a direct effect on the size of blower 30. Level 38 divides the volume of cell 22 into an anaerobic zone 40 and an aerobic zone 42. With oxygen bubbling up through a depth of twenty feet, the efficiency of oxygen transfer from the injected air to the aerobic zone 42 approaches its theoretical maximum of 13 percent. If the aerators 28 and the pipe 38 are positioned at a shallower depth than this, the oxygen transfer efficiency becomes substantially reduced. The blower 30 becomes larger and larger, because more air will have to be pumped in to the aerobic zone 42 to get the same amount of oxygen transfer. On the other hand, if the air pipe 32 is positioned at a depth which is more than twenty feet, more and more pressure in the air conduit 32 would be required in order to clear the pipe and permit the emission of air. This is because of the increase in water pressure that will occur as one goes deeper into the cell. For any particular air volume and aeration requirement, therefore, positioning the pipe 32 at about an elevation of about twenty feet below the planned liquid surface elevation minimizes the size and capacity of the blower 30 necessary.

Because of the large depth of aerated water, the aerators 28 are preferably of the coarse variety, which emits relatively large air bubbles. As the bubbles travel upward in the aerobic zone 42, they become smaller and smaller as air is absorbed into the surrounding liquid, until the bubbles virtually disappear by the time they arrive at the surface. Static tube aerators are preferred because of their minimum maintenance requirements. Preferably, aerators 28 break up the bubbling air by a helical pattern of cross braces.

Most of the cell depth is given over to a combination of the aerobic zone 42 and the anaerobic zone 40. However, a freeboard area 44 is provided which extends the sidewall of the first cell 22 above the third elevation 34. In a preferred embodiment, about three feet of freeboard is provided. The elevation 34 is one around which the actual water level will cycle, the expected variation being a number of inches. Suitable means, such as liners or natural waterproof wall material such as bentonite or other fluid-impermeable clays, are used to seal the cells from each other and from the water table.

While it is preferred that the aerobic zone be about twenty feet deep, the present invention allows a certain amount of variation in design parameters. The aerobic zone can be as shallow as twelve feet deep or as deep as thirty feet deep. The blower size, pressure in the air pipe 32 and depth of the aerobic zone 42 should be chosen such that the oxygen concentration in the aerobic zone 42, once matters reach a steady state, is approximately 9 milligrams per liter, or alternatively the oxygen saturation point. The oxygen concentration of the aerobic zone 42 should in any event not be allowed to fall below 2 milligrams per liter even with an interruptible power supply, as will be hereinafter explained; as long as oxygen concentrations of 2 mg/l and above can be obtained, the cell 22 will not emit much odor.

A further conduit 46 has a first end 48 in the first cell 22 at a location not far below the planned surface elevation 34. Conduit 46 has its other end 50 disposed at or near a bottom 52 of a second cell indicated generally at 54. The second cell 54 is similar in overall function to the first cell 22. However, because the fluid introduced by conduit end 50 will have much less BOD5 and objectionable dissolved gases in it, the aerobic zone 56 of it need not be as deep as the aerobic zone 42 of cell 22. The anaerobic zone 58 of the cell 54 can be two to five feet deep, similar to the depth of the anaerobic zone 40 of cell 22. The anaerobic zone 58 and the aerobic zone 42 are effectively divided one from the other so that the only communication between the two is made through pipe 46.

Cell 54 has aeration equipment installed in it as well, and in the preferred embodiment the aeration comes from the same blower(s) 30 as that of cell 22. This is schematically shown by an extension of the pipe 32 into the cell 54; actually, in both cells the pipe 32 will be a two dimensional network to connect to all of the aerators in the cell. The pipe 32 will be at a predetermined elevation, which in the preferred embodiment is the same as the elevation of the pipe in cell 22, particularly with respect to the orifices 33 at which air bubbles come out of it. A plurality of static tube aerators 62 are provided at spaced locations throughout the cell 54. Once again because the fluid likely to be received by cell 54 is much cleaner than that of the fluid received by cell 22, the aeration required in cell 54 is substantially less than that of cell 22. In one commercial design, 40 percent of the compressed air is provided to aerators 62 in the cell 54, while 60 percent of the compressed air is provided to aerators 28 in cell 22.

A conduit 64 has a first end 66 disposed in the second cell 54 to be slightly below a planned water elevational level 68. The opposite end 70 of the conduit 64 is placed in the bottom of a storage reservoir indicated generally at 72. While the volumes of the cells 22 and 54 are calculated as a function of the total amount of BOD5 to be processed, the volume of storage cell 72 relates rather to the environmental conditions during which treated water may be released. In temperate climates of North America, the cell 72 should be large enough to hold one hundred and fifty days of treated wastewater, assuming a one hundred and fifty day winter during which wastewater may not be withdrawn from the storage reservoir 72 and used for irrigation. This one hundred and fifty-day irrigation capacity is in addition to a smaller conservation pond component 74 at the bottom of the cell 72. A wastewater withdrawal conduit 76 has a first end 78 located at the elevation dividing the conservation pond 74 from the remainder of the volume of the storage reservoir 72.

Treated wastewater from storage reservoir 72 is withdrawn by a pump 80. The pump 80, in conjunction with appropriate valving, pumps a portion of the withdrawn treated wastewater into one or more irrigation conduits indicated schematically at 82, and returns a remaining portion of the water via a supplemental flush water conduit 84 to a flush system 86.

It is preferred that not all of the water to make-up the slurry waste be recycled. In order to keep down nutrient concentrations, new water in conduit 88 is added to the supplemental flush water in the slurry stream at about a one-to-two ratio. When cells 22 and 54 are full and the storage reservoir 72 is filled at least beyond conduit inlet 78, the system is so designed that the amount of irrigated water let out by irrigation conduit 82 will be equivalent in volume to the new water stream 88 as combined with the volume of BOD5 waste from the animals 12, plus an increment of the water stored during the winter season.

The storage reservoir 72 may further have one or more aerators 90, which do not have to be as densely distributed as those in cells 22 or 54. Reclaimed wastewater provided in conduit 82 may be used to irrigate crops with apparatus such as the center pivot rig 92. Center pivot rig 92 may be used to irrigate field corn or the like 94, which will eventually become feed for animals 12 or other animals like them.

The flow volumes of the system according to the invention are quite different from prior art anaerobic lagoon systems, which in general provide just enough water to the waste stream to move the slurry or sludge to the anaerobic lagoon. It is preferred that flush water be added at point 14 in an amount which is eight to twelve times the volumetric waste production of the animals 12. Using this much water has the immediate beneficial effect of improving the environmental conditions under which the animals 12 live, and also reduces the odor coming from the building 10.

Another aspect of the invention inheres in the sizing of the treatment cells 22 and 54 such that they will continue to operate, virtually odor free, with a regularly interruptible power source. This power source is schematically illustrated in FIG. 1 by AC power source 98, connected by power line 100 to a switch 102 that is controlled by a timer 104. Power lines 106 and 108 are respectively connected from switch 102 to comminutor 18 and blower 30. The blower 30 and pump 80 typically are electrically driven. The costs of this electricity may be significantly reduced if the operator of the farm contracts for periodically interrupted power, during which power is supplied at all except peak times in the day. A typical arrangement is to have electricity supplied to the blower 30 and the pump 80 for twenty out of twenty four hours, with the blower and pump being off for four hours during the afternoon of each weekday. Selectively interrupted power of this kind may be purchased at significantly reduced costs, such as 3.7 cents per kilowatt-hour at the time of writing.

In order to take advantage of interruptible power, the lagoons 22 and 54 need to be sized large enough to contain excess oxygen capacity; they act, in essence, as an "oxygen battery". As long as new air is being injected into the system, the oxygen concentration in the aerobic zones 42 and 56 will be close to 9 milligrams per liter, as previously explained.

Once the blower 30 is turned off, the dissolved oxygen begins to react with the reduced inorganic compounds in solution such as organic nitrogen, H2S, NH3 and CH4, gradually becoming less in concentration as nitrates, carbon dioxide and sulfate are produced. When the oxygen content of the aerobic zones 22 and 54 drops below approximately 2 milligrams per liter, there could be some release of unreacted gases from the anaerobic zones 40 and 58, that could produce an odor event. The volumes of the aerobic zones 22 and 54 must therefore be designed to hold an amount of dissolved oxygen which will be great enough to attack pathogens and react with the above reduced gases from the anaerobic zones, such a large majority of the gases coming from the anaerobic zones 40 and 58 are converted, during the time in which the blower 30 is turned off.

For every pound of BOD5 that is processed, approximately four pounds of oxygen will be provided. At a one thousand feet elevation, and assuming ambient temperatures of around 16° C., this translates into approximately 2500 cubic feet of air per day for each pound of BOD5. An operable system might be obtained as values as low as 1500 cubic feet of air per day, but the cushion makes sure that nearly complete conversion of the BOD5 will occur.

Cell 22 is sized to be large enough to retain a detention and treatment time of at least twenty-one days; that is, it is twenty one times the size of the average daily influent from stream slurry waste stream 20. In one design, cell 54 has the same volume as cell 22, and gives a further processing time of twenty-one days. The amount of conversion inside the cells is not linearly related to the residence time but rather by the following formula:

$$t = \frac{E}{2.3 K_1 (100 - E)} \quad (1)$$

Where t is the time in days, E is the percent of BOD5 converted, and $K_1$ is 0.1.

Figure 3:
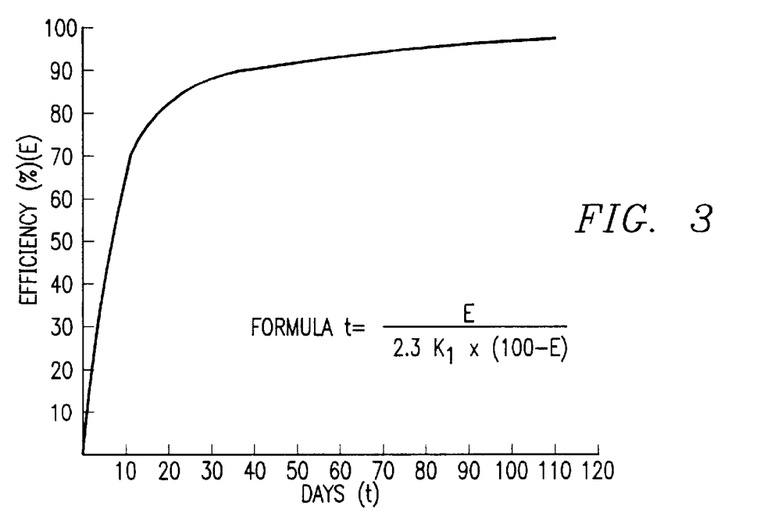
FIG. 3 is a scale of waste conversion efficiency E with respect to time of either of the treatment cells according to a preferred embodiment of the invention.

FIG. 3 is a graph of this conversion efficiency. A large amount of the conversion of the BOD5 occurs within the first ten days. After this, the conversion of further amounts of BOD5 drops off significantly.

One will get a more effective BOD5 conversion if one uses two cells which are isolated from each other than if one uses a single cell having a volume as large as the two cells put together. The inventor has discovered that the use of two cells will allow the operator to take advantage of two relatively quick conversion rates that happen in cell 22 and cell 54. Twenty-one days of residence inside cell 22 will reduce an initial BOD5 reduction by 82.8 percent, and a further twenty-one days of residence in cell 54 will reduce the BOD5 in conduit 46 by 82.8 percent again. Therefore, if an initial BOD5 concentration in the slurry waste line 20 is 2,200 milligrams per liter, the BOD5 concentration in the conduit 46 falls to 378 milligrams per liter, and the BOD5 concentration at end 66 of the conduit 64 is 65 milligrams per liter. Further reduction of BOD5 will occur in the storage reservoir 72.

Another benefit to a two-cell system is process stability in the event of surges or sudden changes in concentration. Such may occur periodically when the confined animal facility is flushed. The second cell, reservoir and recycle stream all contribute to stability and evenness of result.

The storage reservoir 72 should be sized to contain a number of days of design flow equivalent to the number of days of the year during which no effluent discharge can be made. In temperate climates, this is the same as the period of freezing weather. The volume of the conservation pond or volume 74 aside, the storage reservoir 72 should have a storage capacity in the range of one hundred and twenty to one hundred and fifty continuous days of design flow for temperate locations. Further improvement of the wastewater occurs in the reservoir 72, to which air is supplied in much smaller amounts. In particular, a large portion of the nitrate resulting from cells 22 and 54 is reduced to elemental nitrogen and released to the atmosphere.

As the depth of the aerobic zone increases, the efficiency of oxygen transfer from air bubbles introduced at the bottom of the zone also increases. For an aerobic zone which is five feet deep, the efficiency of transfer is only about 4 percent— meaning that of every hundred pounds of oxygen which the blower introduced into the cell, only four would go into solution, assuming that the cell water does not have an initial oxygen concentration which approaches saturation. At ten feet, the transfer efficiency is about 10 percent; at twenty feet, the efficiency is 13 percent. Therefore, to increase the efficiency of oxygen introduction into the aerobic zone, the bottom of the aerobic zone should be made to be deeper.

A significant advantage of the present invention is the reduction in nitrate loading of the irrigated fields. To prevent runoff and pollution of watercourses, nutrients should be applied to cropland only as fast as the irrigated cropland can metabolize it. The nutrient concentration in conventional systems is so great that a particular area of land can only be irrigated with a restricted frequency.

In the present invention, however, much of the nitrogen content in the BOD5 is converted into elemental nitrogen (N2) and is released, harmlessly, into the air. Through the action of anaerobic bacteria, the anaerobic zones gradually convert the volatile solids introduced therein into elemental nitrogen and combined inorganic nitrogen compounds including NO3. The oxygen in the aerobic zones of the cells, as well as that resident in the storage reservoir, is able to convert the combined nitrogen into elemental nitrogen, resulting in only N2 being released as a gas. There is therefore less nitrate and ammonia present in the irrigation stream. This, in turn, means that cropland can be irrigated more frequently without exceeding the maximum nutrient loading thereof. This, in turn, reduces the amount of cropland which needs to be irrigated by this method. The system according to the invention is able to reduce nitrogen content to about 32 percent of its original; this means that only one-third as much cropland needs to be irrigated using this method.

Part of the water withdrawn from the storage reservoir (about two-thirds of it) is recycled back to the animal facility as flushing water. This reintroduces nitrogen into the processing stream, elevating nitrogen content from about 32 percent to about 40 percent relative to the original nitrogen content in the slurry stream. Elevation in nitrogen levels is one reason for use of fresh makeup water to make-up about one third.

EXAMPLE 1

Dairy Farm

In this example, 3,640 dairy cattle, of which 3,060 were lactating cows, were housed in a confined animal feeding facility. These animals produce about 8,150 pounds of volatile solids per day. "Volatile solids" means those solids which eventually will be converted in the anaerobic zone over a period of two years; The remaining amount is "nonvolatile solids", which will not be converted but which will accumulate in the bottom of the cells. The BOD5 was contained in approximately 47,600 gallons per day (gpd) of manure slurry at a concentration of 20,550 mg/l. This amount was rounded up to 50,000 gpd for design purposes. To improve the treatability of the waste flow, 400,000 gpd of water containing 104 lbs. per day of BOD5 were added to the manure slurry to create a 450,000 gpd wastewater flow with a BOD5 concentration of 2,200 mg/l. Of this additional water, 135,000 gpd was new, makeup water and 265,000 gpd was recycled water from a storage reservoir. Total BOD5 concentration at the beginning of the treatment cycle was 8,151 lbs./day for the influent and 104 lbs/day for the flush water, summing to 8,255 lbs./day.

The addition of 400,000 gpd of water of added and recycled water provided for the retention of a greater volume of dissolved oxygen to maintain an aerobic treatment process. It also allowed the use of center-pivot irrigation rigs in applying the reclaimed water to growing crops. The 135,000 gpd of added or "new" water was obtained from captured stormwater runoff from the site, shallow wells, and/or flush water from milk parlors. The storage reservoir contributed 265,000 gpd of recycled water. Assuming that the pumping of all of the 135,00 gpd of makeup water occurs over a period of 20 h/d, the required pumping rate is about 221 gallons per minute.

The aeration system provided 2,500 cubic feet of air per day for each pound of BOD5. The total air flow per day is (2,500)(8,255 lb. of BOD5)=20,637,500 ft$^3$. Operating at 20 hours per day, the blowers produce an air flow rate of (20,637,500/(20)(60))=17,198 cubic feet per minute (cfm). Each static aerator as preferred by the invention emits 40 cfm. The aerators are distributed as follows. Cell I has 287 aerators, Cell II has 133 aerators and the storage reservoir has 10 aerators.

The preferred application rate of 2500 cubic feet of air per pound of BOD5 in the cells supplies about 38 pounds of oxygen. At an oxygen transfer efficiency of 12 percent, this results in 4.5 pounds of oxygen for every pound of BOD5.

Each of the treatment cells was designed to hold about 24 times the average daily influent from the slurry stream, or 13,500,000 gallons, although some error can be made on the side of increasing the cell volumes. A reservoir, which takes the effluent from the second treatment cell as shown in FIG. 1, was constructed which will hold about 30,000,000 gallons of stored treated water and 3,000,000 gallons as a conservation pool.

EXAMPLE 2

Hog Facility

A facility having 3,650 animals was estimated to produce 1,355 lbs. per day of BOD5. This BOD5 is contained in 7,650 gpd of manure and wash water, at a concentration of 21,238 mg/l. To improve the treatability of the wastewater flow, 82,350 gpd of water is added to the manure and wash water to create a 90,000 gpd flow with a BOD5 concentration of 1,805 mg/l.

As in the other systems described herein, this aeration system provided 2,500 cubic feet of air per day for each pound of BOD5. The total air flow per day was (2,500) (1370 pounds of BOD5), or 3,425,000 cubic feet. Assuming that the blowers operate for twenty hours each day on an interruptible power supply, the air flow rate is 3,425,000÷20 h×60 min/h equals 2,854 cubic feet per minute. Each static aerator produces a flow of 40 cfm; therefore, seventy-two static aerators were required.

In this example, the first cell was preexisting and had been used as an anaerobic lagoon. This cell has a volume of 7,663,117 gallons. According to the invention, the cell is divided into 808,576 gallons of anaerobic volume, and 6,854,541 gallons of aerobic volume. Based on an average influent flow of 90,000 gpd, which is created from the sum of 7,650 gpd of waste flow and 82,350 gallons of make-up water, cell 1 has the capacity to provide a treatment time of 42 days and a detention time of 34.2 days.

The efficiency of BOD5 reduction in the first cell can be calculated given a residence time t of forty-two days. Referring to equation (1) reproduced above and assigning K1 as 0.09, the BOD5 will be reduced by 89.68%, and the affluent wastewater stream out of Cell I will have a BOD5 concentration of 186.2 mg/l.

Cell II had a capacity of 10,511,740 gallons; in this example, Cell II was a combination treatment and storage reservoir. It had the capacity to detain the design flow for 116.8 days. A minimum detention time of eleven days will be maintained in Cell II, and the cell will never be completely emptied.

Assuming a residence time of eleven days and using equation (1), the efficiency of BOD5 reduction is calculated as 69.4%. The effluent BOD5 coming from Cell II is at a concentration of 56.98 mg/l.

The hog operations result in 4,100 pounds per day of total solids, of which 3,293.4 pounds per day is volatile solids. The volatile solids essentially break down in fifteen days in Cell I. The nonvolatile solids remain and are stored in Cell I for a period of years. A total of 806.4 pounds per day of nonvolatile solids are produced, resulting in a yearly production of 294,336 pounds. At 2,000 pounds per cubic yard, the yearly volume is 147.2 cubic yards. The volume available for anaerobic storage of solids in Cell I is 808,576 gallons, giving a storage capacity of 27.2 years before Cell I will have to be emptied.

The cells must accommodate 150 days of flow or 13,500,000 gallons because of winter storage requirements. These storage requirements are met by the sizes of Cell I and Cell II, which together provide 151 days of storage.

In this example, the irrigation season was 215 days or 30 weeks. The volume to be irrigated is equal to 90,000 gpd times 365 days, or 32,850,000 gallons. This is the same as 100.8 acre feet or 1210 acre inches per year. For a thirty week irrigation season, an average of 40 acre inches per week will be applied. At an average irrigation time of forty hours per week, the irrigation pumpage rate is 456.3 gpm. A pump with 500 gpm capacity is therefore used.

The calculation of the minimum land application area for the irrigation is determined by the nitrogen content of the effluent. The nitrogen loss after 42 days of aeration in Cell I is 28%, leaving a remainder which is equal to 40,846 pounds of nitrogen. After 151 days of storage and aeration, which includes the total detention time in cells one and two, the nitrogen loss is 68%, leaving 13,071 pounds of nitrogen. The irrigation processes causes a further loss of 20% through denitrification, leaving a remainder of 10,457 pounds of nitrogen which is the quantity actually available to growing crops. At an application rate of 200 pounds per acre, the minimum acreage for irrigation is 52.29 acres. The weekly average irrigation rate is 0.77 inch per week.

Where 90,000 gpd is used for irrigation, 82,350 gpd will have to be made up from make-up water.

In addition to making this hog facility friendly to neighbors, the system according to the invention has certain economic effects which partially offset the cost of its installation and operation. The custom application of manure no longer has to be done. Corn production is increased, while conventional fertilizer applications are reduced. Drought insurance on the irrigated acres is avoided. There are also more efficient feed conversion/increased air quality benefits which will evidence themselves in increased weight gains of the animals.

EXAMPLE 3

Residential Subdivision

The present invention also has application to noncommercial waste disposal problems. One application is to a subdivision of residences which are not able to connect to a city sewer system, and are too closely spaced to permit septic fields. In this situation, a two-cell anaerobic/aerobic wastewater treatment system may be employed.

In this example, the subdivision consists of 975 single-family homes, half of which may house accessory units, as well as a community center, two schools, numerous village and agricultural/commercial business and a large area of green space which can accept irrigation.

For this development, three different waste treatment systems were provided. Each of the three systems had two treatment cells. Each of the cells had a total depth of twenty-six feet, including three feet of freeboard. The anaerobic zone of each cell is three feet deep, and the aerobic zone is twenty feet deep.

The residence time in the first treatment cell is 21 days, and the residence time in the second cell is 16 days, to give a total treatment cycle of 37 days. In addition, a storage reservoir is provided for an average of 144 days so that no reclaimed water will need to be discharged during a non-irrigation season. The site is located in a northern climate zone. After treatment in two stages according to the invention, the wastewater is passed through a pressure sand filter and disinfected with sodium hypochlorite at a minimum contact time of fifteen minutes. This will insure a fecal coliform count of less than 2.2/100 ml.

From the reservoir, the water will be discharged for irrigation both of public areas and adjacent agricultural areas. The discharge water may also be used to operate several water features in the subdivision, such as fountains and the like. All cells were landscaped with native vegetation and are useful as wildlife habitats.

The design parameters for these three related systems are set forth in the following table:

Design Parameters

System I:
1. Treatment Cell I
145,120 gpd×21 days=3,047,520 gallons
3,047,520 gallons/325,851 gallons/acre feet=9.4 acre feet
2. Treatment Cell II
145,120 gpd×16 days=2,321,920 gallons
2,321,920 gallons/325,851 gallons/acre feet=7.1 acre feet
3. Storage Cell
145,120 gal×135 days=19,591,200 gallons
19,591,200 gallons/325,851 gallons/acre feet=60.1 acre feet
4. Irrigation Flow
32.9 weeks×5 days/week=164 irrigation days/year
145,120 gpd×365 days/year=52,968,800 gallons/year
52,968,800 gallons/year/164 days/year=322,980 gpd 5. Pressure Sand Filters
loading rate–4.7 gpm/sq.ft.
flow=322,980 gpd/([10 hr./day)(60 min/hr.)]=538 gpm
538 gpm/4.7 gpm/sq.ft.=115 sq.ft.

System II:
1. Treatment Cell I
72,460 gpd×21 days=1,521,660 gallons
1,521,660 gallons/325,851 gallons/acre feet=4.74 acre feet
2. Treatment Cell II
72,460 gpd×16 days=1,159,360 gallons
1,159,360 gallons/325,851 gallons/acre feet=3.6 acre feet
3. Storage Cell
72,460 gal×135 days=13,694,940 gallons
13,694,940 gallons/325,851 gallons/acre feet=42.0 acre feet
4. Irrigation Flow
72,460 gpd×365 days/year=26,447,900 gallons/year
26,447,900 gallons/year/125 days/year=211,583 gpd
5. Pressure Sand Filters
flow=211,583 gpd/([10 hr./day)(60 min/hr.)]=353 gpm
353 gpm/4.7 gpm/sq.ft.=75 sq.ft.

System III:
1. Treatment Cell I
72,600 gpd×21 days=1,524,660 gallons
1,524,600 gallons/325,851 gallons/acre feet=4.7 acre feet
2. Treatment Cell II
72,600 gpd×16 days=1,616,600 gallons
1,616,600 gallons/325,851 gallons/acre feet=3.6 acre feet
3. Storage Cell
72,600 gal×188 days=13,648,800 gallons
13,648,800 gallons/325,851 gallons/acre feet=42 acre feet
4. Irrigation Flow
72,600 gpd×365 days/year=26,499,000 gallons/year
26,499,000 gallons/year/125 days/year=211,992 gpd
5. Pressure Sand Filters
flow=211,992 gpd/([10 hr./day)(60 min/hr.)]=353 gpm
353 gpm/4.7 gpm/sq.ft.=75 sq.ft.

Using a base 10 reaction coefficient K of 0.10 at 60° F. for domestic wastewater, the percent of $BOD_5$ removed in Cell I of each of the three systems is 83%. With an influent $BOD_5$ loading of 255 mg/L, the effluent to Cell II has a $BOD_5$ loading of 43.4 mg/L. The reduction in Cell II is computed to be 79%, yielding a $BOD_5$ in the effluent of Cell II of 9.1 mg/L.

The chemical oxygen demand for the cells, for untreated domestic wastes, varies from 0.4 to 0.8 mg/L per mg/L of $BOD_5$. The following formula is used to compute chemical oxygen demand (COD) reduction:

$$t = (n/K_T)[(C_o/C_n)^{1/n} - 1] \qquad (2)$$

where:

$t$=detention time, days $n$=number of ponds $K_T$=reaction rate at design temperature, $days^{-1}$ $C_o$=influent COD concentration, mg/L $C_n$=Effluent COD concentration after N ponds, mg/L The constant $K_T$ is 0.276 at 20° C. Adjusting for an average pond temperature of 15° C. gives a $K_{15}$ of 0.231 $day^{-1}$. $C_2$, being the effluent COD concentration at the second cell, is 15.3 mg/L.

The nitrogen after treatment is computed using the following formula:

$$N_{\text{eff}} = (N \text{ concentration}) e^{-0.0075(\text{detention time/days})} 10 \qquad (3)$$

where:

$N_{\text{eff}}$=Nitrogen concentration in effluent

Using this formula, it is calculated that $N_{\text{eff}}$ from Cell I is 31.6 mg/L and $N_{\text{eff}}$ is 28.0 mg/L for Cell II. After 135 days of residence in a combination of Cell I, Cell II and a reservoir, an $N_{\text{eff}}$ drops to 10.1 mg/L. This amounts to a nitrogen loading of 84.2 lbs. per 1,000,000 gallons of reclaimed water, resulting in a yearly amount of available nitrogen of 8,918 lbs.

Each of the cells has a width at the top of the berm of 10 feet and interior slopes of 2:1. Coarse aerators of the kind herein described are used in all three systems, each aerator having a capacity of 40 cubic feet per minute. A value of 2500 cubic feet of air per pound of BOD5 is used to determine the number of aerators in each system. System I, which is designed to handle 308.4 pounds of BOD5 per day, requires fourteen aerators and a blower capable of producing 560 cubic feet of air per minute. System II handles 154.0 pounds of BOD5 per day, resulting in seven aerators and 280 cubic feet of air per minute from a connected blower. System III is designed to handle 154.4 pounds of BOD5 per day, resulting in seven aerators and another 280 cubic feet per minute of air from the blower.

Each of the treatment cells is lined with an impervious, 30 mil reinforced polypropylene liner with a maximum exfiltration rate of $1 \times 10^{-7}$ cm/sec.

The number of days when irrigation is not possible may be defined by an EPA-3 model for the local weather station. The EPA-3 model uses the following criteria to determine an unfavorable day: one in which any one of the following daily conditions are met; precipitation is greater than 0.5 inch, snow depth is greater than 1.00 inch, or a maximum temperature of less than 40° F. In the example, the system design is such that no irrigation takes place during precipitation, when 0.25 inches of rain have fallen in the previous twenty-four hours, when the ground is otherwise saturated or ponded with water, when the ground is frozen or covered with snow, or when the wind velocity exceeds 20 mph.

For disinfection, the daily dosages and chamber volume are given in the following table:

|  | Sodium Hypochlorite Daily Dosage (gpd) | Contact Chamber Volume (ft$_3$) |
| --- | --- | --- |
| System I | 3.15 | 1,079 |
| System II | 2.07 | 708 |
| System III | 2.07 | 708 |

If the amount of solids entering the treatment cells is estimated to be 0.2 lbs.per capita per day, the volume of sludge accumulating in the cells may be established using the following formula:

$$V = [1 + [(1-x)/x]](1-P) W 10^{-6}$$

Where V equals the sludge volume remaining after two years, in cubic meters, W equals the weight of solids deposited after two years, in grams, P equals percent solids reduction during two years, estimated as 75%, and x equals percent of solids remaining, estimated as 5%. Based on this equation, the number of years for each of the systems is 16.2 years, 15.6 years and 15.8 years, respectively. The solids may be removed using a floating dredge and may be stabilized, if necessary, by the addition of lime sufficient to raise the pH level to 11, and then disposed of in a state approved facility.

The reclaimed water also contains phosphorus and potassium nutrients at 4.6 and 9.4 mg/L, yielding 4,063 and 8,303 pounds per year, respectively.

In summary, a novel two-cell combination anaerobic/aerobic waste treatment system has been shown and described. While the invention has been described with the aid of examples and preferred embodiments in the above detailed description, the invention is not limited thereto but only by the scope and spirit of the appended claims.

What is claimed is:

1. A biodegradable mass treatment system, comprising:

a source of biodegradable mass as entrained in a wastewater stream;

a first treatment cell having a bottom at a first elevation, a first conduit connecting the biodegradable mass source with the first cell, an end of the first conduit disposed in the first cell near the first elevation;

first aerator means disposed in the first cell for introducing air into the first cell at a second elevation spaced from the first elevation by at least two feet, the first aerator means coupled to a source of compressed air, a first anaerobic zone extending from the first elevation to the second elevation;

a water surface of the first cell maintained at about a third elevation, a first aerobic zone defined in the first cell to extend from the second elevation to the water surface of the first cell, the difference between the third elevation and the second elevation being at least twelve feet;

a second treatment cell sealed from the first cell and having a bottom at a fourth elevation, second aerator means disposed in the second cell and introducing air into the second cell at a fifth elevation spaced from the fourth elevation by at least two feet, a second anaerobic zone extending from the fourth elevation to the fifth elevation, the second aerator coupled to a source of compressed air;

a water surface of the second cell maintained at about a sixth elevation, a second aerobic zone defined in the second cell to extend from the fifth elevation to the water surface of the second cell, the difference between the fifth elevation and the sixth elevation being at least twelve feet;

a second conduit having a first end disposed in the first aerobic zone near the third elevation and having a second end disposed in the second anaerobic zone near the fourth elevation; and a third conduit for removing treated water from the second cell, an end of the third conduit disposed in the second cell near the sixth elevation.

2. The treatment system of claim 1, wherein the source of compressed air for the first and second aerators is sized to introduce at least three pounds of oxygen into the sum of the first and second aerobic zones for every pound of biodegradable mass introduced into the first cell in the wastewater stream.

3. The treatment system of claim 2, wherein the source of compressed air for the first and second aerators is sized to introduce at least four and one half pounds of oxygen into the sum of the first and second aerobic zones for every pound of biodegradable mass introduced into the first cell from the biodegradable mass source.

4. The system of claim 1, wherein the depth of the first anaerobic zone is in the range of two to five feet.

5. The system of claim 1, wherein the depth of the second anaerobic zone is in the range of two to five feet.

6. The system of claim 1, wherein the distance between the second and third elevations is in the range of twelve to 25 feet.

7. The system of claim 1, wherein the difference between the fifth and sixth elevations is in the range of twelve to 25 feet.

8. The treatment system of claim 1, wherein the third and sixth elevations are substantially equal.

9. The treatment system of claim 1, and further comprising a storage reservoir, a second end of the third conduit disposed in the storage reservoir to introduce treated water therein from the second cell.

10. The treatment system of claim 9, wherein the wastewater stream introduced into the first cell has an average daily discharge volume of w, means for periodically withdrawing treated water from a storage volume for beneficial use, the means for periodically withdrawing treated water operating under predetermined environmental conditions, a volume of the storage reservoir being at least dw where d is the longest number of consecutive days likely to be experienced by the site at which the treatment system is installed during which no withdrawal of treated water can be made.

11. The treatment system of claim 1, wherein at least one of the first and second aeration means comprises a plurality of coarse aerators.

12. The treatment system of claim 10, wherein said at least one of the first and second aeration means is a plurality of static tube aerators.

13. A confined animal operation, comprising:
   a confined animal facility in which a plurality of animals are housed;
   a waste conduit having an end coupled to the facility for carrying away biodegradable waste from the animals;
   at least one treatment cell, a bottom of the treatment cell located at a first elevation, a second end of the waste conduit disposed in the cell near the first elevation;
   aeration means disposed in the treatment cell for introducing air into the cell at a second elevation spaced above the first elevation by at least two feet, an anaerobic zone defined between the first and second elevations, a source of compressed air coupled to the aeration means;
   a third elevation of the treatment cell spaced above the second elevation by at least twelve feet, a water surface level of cell maintained to be at or near the third elevation, an aerobic zone defined between the second and third elevations; and
   a second conduit for carrying away water treated in the first cell, an end of the second conduit disposed in the first cell near the third elevation.

14. The confined animal feeding operation of claim 13, and further comprising:
   a storage reservoir sized to store a number of days of average daily effluent equivalent to a nongrowing season of the locale where the operation is sited.

15. The confined animal operation of claim 13, and further comprising:
   a recirculation conduit disposed in a recirculation path from the second conduit to the confined animal facility and an irrigation conduit disposed in an irrigation path from the second conduit to a crop irrigation site, a predetermined portion of the stream in the second conduit directed to recirculate back to the confined animal facility as flush water, a further predetermined portion of the stream in the second conduit directed to the irrigation conduit, a stream of makeup water added to the recirculation path prior to its reuse in the confined animal facility.

* * * * *